(12) United States Patent
Lambert et al.

(10) Patent No.: US 10,830,144 B2
(45) Date of Patent: Nov. 10, 2020

(54) GAS TURBINE ENGINE COMPRESSOR IMPELLER COOLING AIR SINKS

(71) Applicant: Rolls-Royce North American Technologies, Inc., Indianapolis, IN (US)

(72) Inventors: Tony A. Lambert, Brownsburg, IN (US); Behram V. Kapadia, McCordsville, IN (US); Ron Hall, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 494 days.

(21) Appl. No.: 15/259,883

(22) Filed: Sep. 8, 2016

(65) Prior Publication Data

US 2018/0066579 A1  Mar. 8, 2018

(51) Int. Cl.
| | | |
|---|---|---|
| *F02C 3/08* | (2006.01) | |
| *F02C 7/18* | (2006.01) | |
| *F04D 29/44* | (2006.01) | |
| *F01D 25/12* | (2006.01) | |
| *F02C 3/04* | (2006.01) | |
| *F02C 6/08* | (2006.01) | |

(Continued)

(52) U.S. Cl.
CPC ............... *F02C 7/18* (2013.01); *F01D 9/041* (2013.01); *F01D 25/12* (2013.01); *F02C 3/04* (2013.01); *F02C 3/08* (2013.01); *F02C 6/08* (2013.01); *F02C 7/16* (2013.01); *F04D 29/444* (2013.01); *F05D 2220/32* (2013.01); *F05D 2240/12* (2013.01); *F05D 2260/232* (2013.01); *F05D 2260/234* (2013.01); *Y02T 50/675* (2013.01)

(58) Field of Classification Search
CPC ........ F02C 33/05; F02C 33/08; F02C 33/085; F02C 33/09; F02C 33/103; F02C 6/08; F02C 7/18; F01D 25/12
See application file for complete search history.

(56) References Cited

U.S. PATENT DOCUMENTS

| | | |
|---|---|---|
| 2,777,395 A | 1/1957 | Disbrow |
| 3,357,176 A * | 12/1967 | Williams .............. F04D 19/026 60/792 |
| 3,979,903 A | 9/1976 | Hull |

(Continued)

FOREIGN PATENT DOCUMENTS

| | | |
|---|---|---|
| EP | 1167722 A2 | 1/2002 |
| EP | 2206902 A1 | 7/2010 |

(Continued)

OTHER PUBLICATIONS

Extended European Search Report, European Application No. 17187116.3-1007, dated Jan. 22, 2018, 7 pages.

(Continued)

*Primary Examiner* — Gerald L Sung
*Assistant Examiner* — Marc J Amar
(74) *Attorney, Agent, or Firm* — Barnes & Thornburg LLP

(57) ABSTRACT

A gas turbine engine includes devices, systems, and methods for providing bleed air from the compressor impeller to the turbine for cooling and/or other use. The bleed air may include compressor cooling air that is routed through the diffuser and external to an outer bypass duct and/or internally to a forward wheel cavity of the turbine.

17 Claims, 3 Drawing Sheets

(51) Int. Cl.
*F02C 7/16* (2006.01)
*F01D 9/04* (2006.01)

(56) References Cited

U.S. PATENT DOCUMENTS

| | | | |
|---|---|---|---|
| 4,256,436 A | 3/1981 | Fandrey et al. | |
| 4,459,802 A | 7/1984 | Mowill | |
| 4,462,204 A | 7/1984 | Hull et al. | |
| 4,761,947 A * | 8/1988 | Hennecke | F02C 7/12 |
| | | | 415/115 |
| 4,786,238 A | 11/1988 | Glaser et al. | |
| 4,800,717 A | 1/1989 | Rodgers | |
| 5,147,178 A | 9/1992 | Treece | |
| 5,174,105 A * | 12/1992 | Hines | F02C 3/10 |
| | | | 60/774 |
| 5,224,822 A | 7/1993 | Lenahan et al. | |
| 5,385,442 A | 1/1995 | Lehe et al. | |
| 5,555,721 A * | 9/1996 | Bourneuf | F02C 7/18 |
| | | | 415/115 |
| 5,996,331 A * | 12/1999 | Palmer | F02C 6/08 |
| | | | 415/115 |
| 6,035,627 A | 3/2000 | Liu | |
| 6,155,777 A * | 12/2000 | Aschenbruck | F04D 29/444 |
| | | | 415/115 |
| 6,183,195 B1 | 2/2001 | Tremaine | |
| 6,190,123 B1 * | 2/2001 | Wunderwald | F02M 39/00 |
| | | | 415/168.1 |
| 6,234,746 B1 | 5/2001 | Schroder et al. | |
| 6,238,179 B1 | 5/2001 | Wunderwald et al. | |
| 6,257,834 B1 | 7/2001 | Bremer et al. | |
| 6,276,896 B1 | 8/2001 | Burge et al. | |
| 6,513,335 B2 | 2/2003 | Fukutani | |
| 6,585,482 B1 * | 7/2003 | Liotta | F02C 3/08 |
| | | | 415/1 |
| 6,966,191 B2 | 11/2005 | Fukutani et al. | |
| 7,287,384 B2 | 10/2007 | Fish et al. | |
| 7,628,018 B2 * | 12/2009 | Mowill | F01D 5/043 |
| | | | 415/102 |
| 7,682,131 B2 | 3/2010 | Legare et al. | |
| 7,743,613 B2 * | 6/2010 | Lee | F01D 9/065 |
| | | | 415/115 |
| 7,775,758 B2 | 8/2010 | Legare | |
| 7,827,798 B2 | 11/2010 | Commaret et al. | |
| 7,841,187 B2 | 11/2010 | Behajhel et al. | |
| 7,942,630 B2 | 5/2011 | Argaud et al. | |
| 8,029,238 B2 | 10/2011 | Argaud et al. | |
| 8,075,247 B2 | 12/2011 | Romani et al. | |
| 8,147,178 B2 | 4/2012 | Ottaviano et al. | |
| 8,177,475 B2 | 5/2012 | Joco et al. | |
| 8,226,353 B2 | 7/2012 | Argaud et al. | |
| 8,336,317 B2 | 12/2012 | Blanchard et al. | |
| 8,402,770 B2 | 3/2013 | Gann et al. | |
| 8,529,195 B2 | 9/2013 | Widener | |
| 8,800,291 B2 | 8/2014 | Bil et al. | |
| 8,920,128 B2 | 12/2014 | Matwey et al. | |
| 8,935,926 B2 | 1/2015 | Wagner et al. | |
| 9,003,793 B2 | 4/2015 | Begin et al. | |
| 9,228,497 B2 | 1/2016 | Ottow et al. | |
| 9,650,916 B2 | 5/2017 | Barton et al. | |
| 9,683,488 B2 | 6/2017 | Ress et al. | |
| 10,359,051 B2 | 7/2019 | Gage et al. | |
| 10,415,391 B2 | 9/2019 | Duong et al. | |
| 2010/0028138 A1 * | 2/2010 | Argaud | F01D 5/046 |
| | | | 415/177 |
| 2010/0077768 A1 * | 4/2010 | Leblanc | F02C 3/08 |
| | | | 60/785 |
| 2010/0158668 A1 * | 6/2010 | Ottaviano | F02C 3/08 |
| | | | 415/104 |
| 2012/0087784 A1 * | 4/2012 | Widener | F02C 7/18 |
| | | | 415/180 |
| 2012/0102969 A1 * | 5/2012 | Wagner | F02C 6/08 |
| | | | 60/785 |
| 2012/0167595 A1 * | 7/2012 | Ottow | F02C 3/04 |
| | | | 60/806 |
| 2016/0186601 A1 * | 6/2016 | Manning | F01D 25/002 |
| | | | 415/121.2 |
| 2017/0248155 A1 * | 8/2017 | Parker | F02C 3/08 |
| 2018/0291927 A1 * | 10/2018 | Kerth | F04D 29/584 |
| 2018/0291928 A1 | 10/2018 | Kenworthy et al. | |

FOREIGN PATENT DOCUMENTS

| | | | |
|---|---|---|---|
| EP | 2206902 A2 | 7/2010 | |
| EP | 2447504 A2 | 5/2012 | |
| EP | 3040521 A1 | 7/2016 | |
| GB | 652991 A * | 5/1951 | F02C 6/003 |

OTHER PUBLICATIONS

European Office Action, dated Mar. 20, 2020 in connection with European Application No. 17187116.3, 6 pages.

* cited by examiner

GAS TURBINE ENGINE COMPRESSOR IMPELLER COOLING AIR SINKS

FIELD OF THE DISCLOSURE

The present disclosure relates generally to gas turbine engines, and more specifically to gas turbine engine including centrifugal compressors.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Exhaust products of the combustion reaction in the combustor are directed into the turbine where work is extracted to drive the compressor and, sometimes, an output shaft, fan, or propeller.

In certain adapted uses, gas turbine engines may include one or more stages of centrifugal compressors. Cooling centrifugal compressors can improve component lifetime and performance.

SUMMARY

The present disclosure may comprise one or more of the following features and combinations thereof.

According to one aspect of the disclosure, a gas turbine engine may include an engine core defining a rotating axis, the engine core may include a compressor having an impeller arranged to rotate about the axis to compress air with an impeller tip and a diffuser for collecting compressed air from the impeller tip, a combustor fluidly connected to receive compressed air from the diffuser for combustion, and a turbine fluidly connected to receive exhaust products from the combustor, the impeller, the diffuser, the combustor, and the turbine collectively defining a core flow path; an outer shell disposed about the engine core to house the engine core therein; and a bleed circuit fluidly connected between the compressor and the turbine for communicating bleed of impeller air from the impeller to the turbine, the bleed circuit may include a bleed inlet arranged at the impeller tip and configured to bleed a stream of impeller air out from the core flow path and to communicate the stream to a deposit junction of the turbine.

In some embodiments, the deposit junction may include a forward wheel cavity of the turbine and the stream of impeller air enters and purges the forward wheel cavity.

In some embodiments, the stream of impeller air may pressurize the forward wheel cavity and may leak into the core flow path at a location between a first stage vane and a first stage blade of the turbine.

In some embodiments, the deposit junction may include a vane cooling path of a second stage vane of the turbine and the stream of impeller air passes through the vane cooling path to cool the second stage vane.

In some embodiments, the bleed circuit may include at least one inlet passage defined through at least one blade of the diffuser and in communication with the bleed inlet to receive bleed of impeller air.

In some embodiments, the bleed circuit may include at least one transport passage in fluid communication with the at least one inlet passage, the transport passage penetrating through the outer shell and extending along the axis outside of the outer shell to a location near the turbine and into a plenum of the second stage vane of the turbine.

In some embodiments, the stream may pass through the at least one inlet passage in a direction towards a forward end of the gas turbine engine. In some embodiments, the bleed circuit may include a bleed inlet formed at least partially within a clearance of the impeller.

According to another aspect of the disclosure, a gas turbine engine may include an engine core defining a rotating axis, the engine core may include a compressor for compressing air, a combustor fluidly connected to receive compressed air from the compressor for combustion, and a turbine fluidly connected to receive exhaust products from the combustor; the compressor, the combustor, and the turbine collectively defining a core flow path; and a bleed circuit fluidly connected between the compressor and the turbine for communicating bleed of air from an impeller of the compressor, the bleed circuit may include a bleed inlet arranged at a tip of the impeller and configured to bleed a stream of air out from the core flow path and to communicate the stream to a deposit junction of the turbine.

In some embodiments, the deposit junction may include a forward wheel cavity of the turbine and the stream of air enters the forward wheel cavity for purging the same.

In some embodiments, the stream may pressurize the forward wheel cavity and may leak into the core flow path at a location between a first stage vane and a first stage blade of the turbine.

In some embodiments, the deposit junction may include a vane cooling path of a second stage vane of the turbine and the stream of air passes through the vane cooling path to cool the second stage vane.

In some embodiments, the compressor may include a diffuser having a number of blades arranged to collect compressed air from the compressor and the bleed circuit comprises at least one inlet passage defined through at least one of the number of blades of the diffuser and in communication with the bleed inlet to receive the stream of air.

In some embodiments, the bleed circuit may include at least one transport passage in fluid communication with the at least one inlet passage, the transport passage penetrating through an outer shell of the engine and extending along the axis outside of the outer shell to a location near the turbine and into a plenum of the second stage vane of the turbine.

In some embodiments, the stream may pass through the at least one inlet passage in a direction towards a forward end of the gas turbine engine.

According to another aspect of the disclosure, a method of operating a gas turbine engine may include flowing an engine core flow through each of a compressor, a combustor, and a turbine fluidly, bleeding a stream of air in a bleed circuit from a tip of an impeller of the compressor out from the core flow path, and depositing the stream to a deposit junction of the turbine.

In some embodiments, the deposit junction may include a vane cooling path of a second stage vane of the turbine and the stream of air passes through the vane cooling path to cool the second stage vane.

In some embodiments, bleeding may include flowing the stream of air through at least one inlet passage defined through at least one of a number of blades of a diffuser of the compressor.

In some embodiments, bleeding may include flowing the stream of air through at least one transport passage that extends along the engine outside of an outer shell to a location near the turbine and into a plenum of the second stage vane of the turbine.

In some embodiments, bleeding may include passing the stream through the at least one inlet passage in a direction towards a forward end of the gas turbine engine.

These and other features of the present disclosure will become more apparent from the following description of the illustrative embodiments.

DETAILED DESCRIPTION OF THE DRAWINGS

Figure 1:
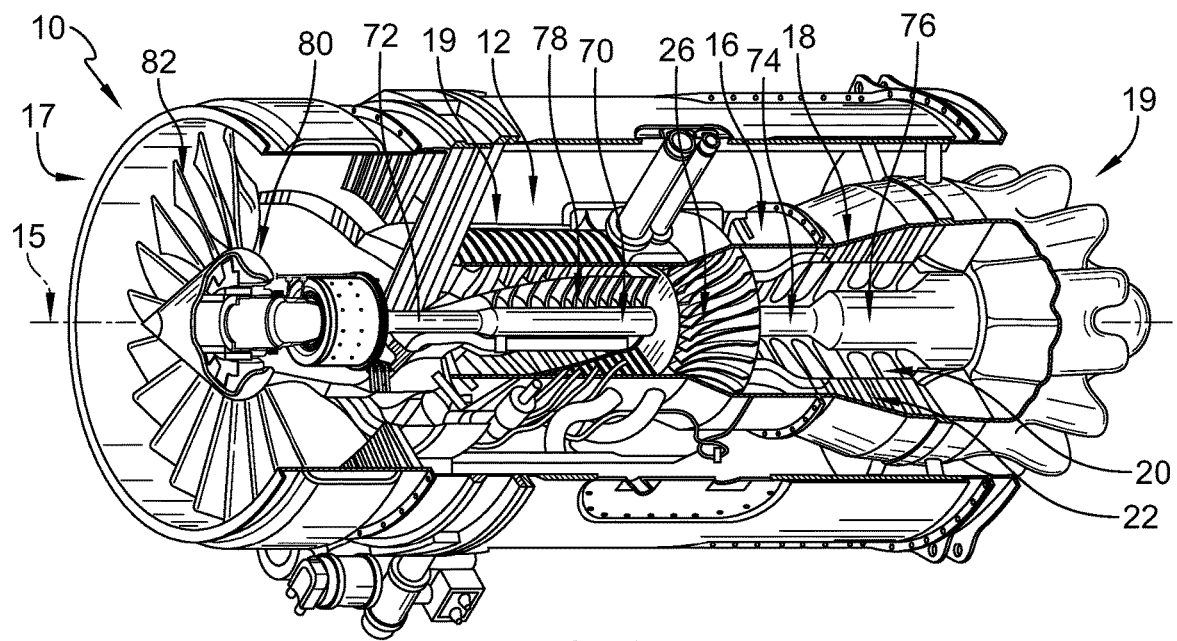
FIG. 1 is an perspective view of a gas turbine engine including a compressor having an impeller with an impeller tip for discharging compressed air, a combustor, and a turbine and showing that gas turbine engine includes a bleed circuit for bleeding air from the impeller for distribution downstream for use in the turbine.

For the purposes of promoting an understanding of the principles of the disclosure, reference will now be made to a number of illustrative embodiments illustrated in the drawings and specific language will be used to describe the same.

Gas turbine engines combust a mixture of fuel and compressed air into exhaust products that produce rotational force by expanding through a turbine sections of the engine. The compressed air is typically generated by one or more dedicated compressors. Gas turbine engines can include one or more centrifugal compressors each having an impeller that is driven for rotation by the rotational force of the turbine section to compress air.

Compressor impeller can generate high temperatures in operation. Cooling compressor impellers in operation can improve impeller function and life. Compressor impellers can be cooled using bleed air that is subsequently discarded, sacrificing both the temperature and pressure of that cooling air. By reusing the cooling air which cools the impeller, the operational efficiency of the gas turbine engine can be increased while maintaining improved impeller operation and life. The present disclosure includes bleed circuits for reusing bleed air from compressor impellers within other areas of the gas turbine engines.

An illustrative gas turbine engine 10 includes an engine core 12 defining a rotational axis 15 that extends between a forward end 17 and an aft end 19 as shown in FIG. 1. The engine core 12 illustratively includes a compressor 14 for compressing air, a combustor 16 that mixes fuel with compressed air from the compressor 14 and combusts the mixture to form exhaust products, and a turbine 18 including a turbine rotor 20 having radially extending turbine blades 22 through which the exhaust products expand to drive rotation of the turbine rotor 20 about the axis 15. The engine core 12 defines a core flow path comprising a flow path of air compressed by the compressor 14, the compressed air combusted in the combustor 16 into exhaust products, and the exhaust products expanded within the turbine 18.

Figure 2:
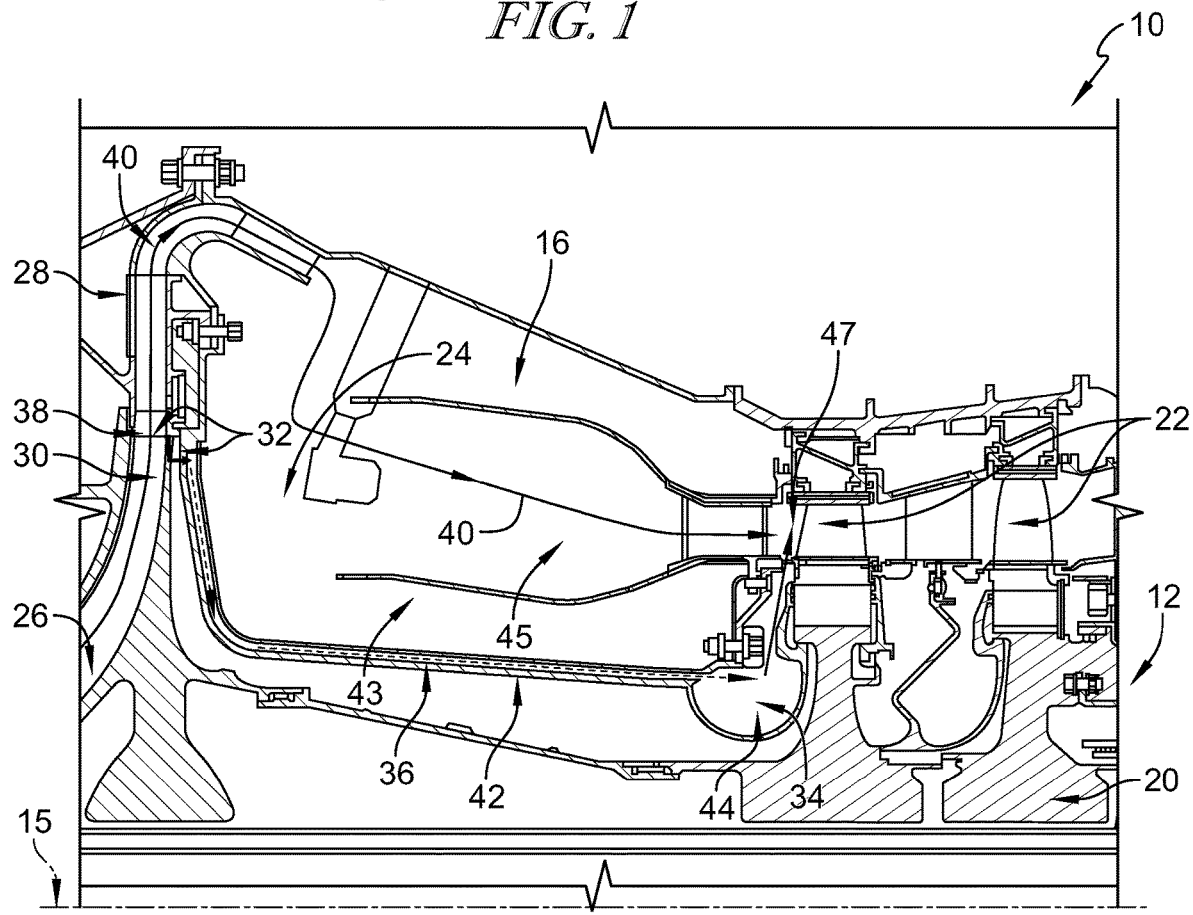
FIG. 2 is a cross-sectional view of the gas turbine engine of FIG. 1 taken along the window section 2-2 showing an embodiment of the bleed circuit in which bleed air is taken from the impeller through a bleed inlet and directed through internal portions of the gas turbine engine into a forward wheel cavity of the turbine and into a core flow path.

In the illustrative embodiment as shown in FIGS. 1 and 2, a bleed circuit 24 fluidly connects the compressor 14 and the turbine 18 to communicate a bleed stream of air from the compressor 14 to the turbine 18 for cooling and/or purging. The bleed circuit 24 is illustratively embodied as a flow passage distinct from the core flow path to provide bleed air to the turbine 18. The bleed circuit 24 illustratively extends between the compressor 14 and the turbine 18 along the axis 15 of the gas turbine engine 10.

Referring to FIG. 1, the compressor 14 illustratively includes an impeller 26 arranged to rotate about the axis 15 to compress air and a diffuser 28 disposed about the impeller 26 to gather compressed air from the impeller 26. As best shown in FIG. 2, the impeller 26 illustratively includes an impeller tip 30 disposed on a downstream end thereof for discharging compressed air to the diffuser 28. As the impeller 26 and the impeller tip 30 rotate about the axis 15, the diffuser 28 remains stationary to receive the compressed air that is discharged from the impeller tip 30. The diffuser 28 illustratively receives the compressed air from the impeller tip 30 of the compressor 14 and guides the compressed air for use in the combustor 16. The diffuser 28 generally slows the velocity of incoming air to increase the pressure of the outgoing air (converts velocity into pressure).

As shown in FIG. 2, the bleed circuit 24 illustratively includes a bleed inlet 32 for bleeding a stream of air from the compressor 14, a deposit junction 34 for expelling the stream into the turbine 18, and a transport section 36 fluidly connected between the bleed inlet 32 and the deposit junction 34 to communicate bleed air therebetween. The bleed inlet 32 is illustratively embodied as a bleed passage arranged near to the impeller tip 30, and particularly, near to an interface gap 38 between the impeller tip 30 and the diffuser 28. The bleed inlet 32 is configured to receive a stream of bleed air from the impeller tip 30 outside of the core flow path (as represented by arrows 40 in FIG. 2).

Figure 3:
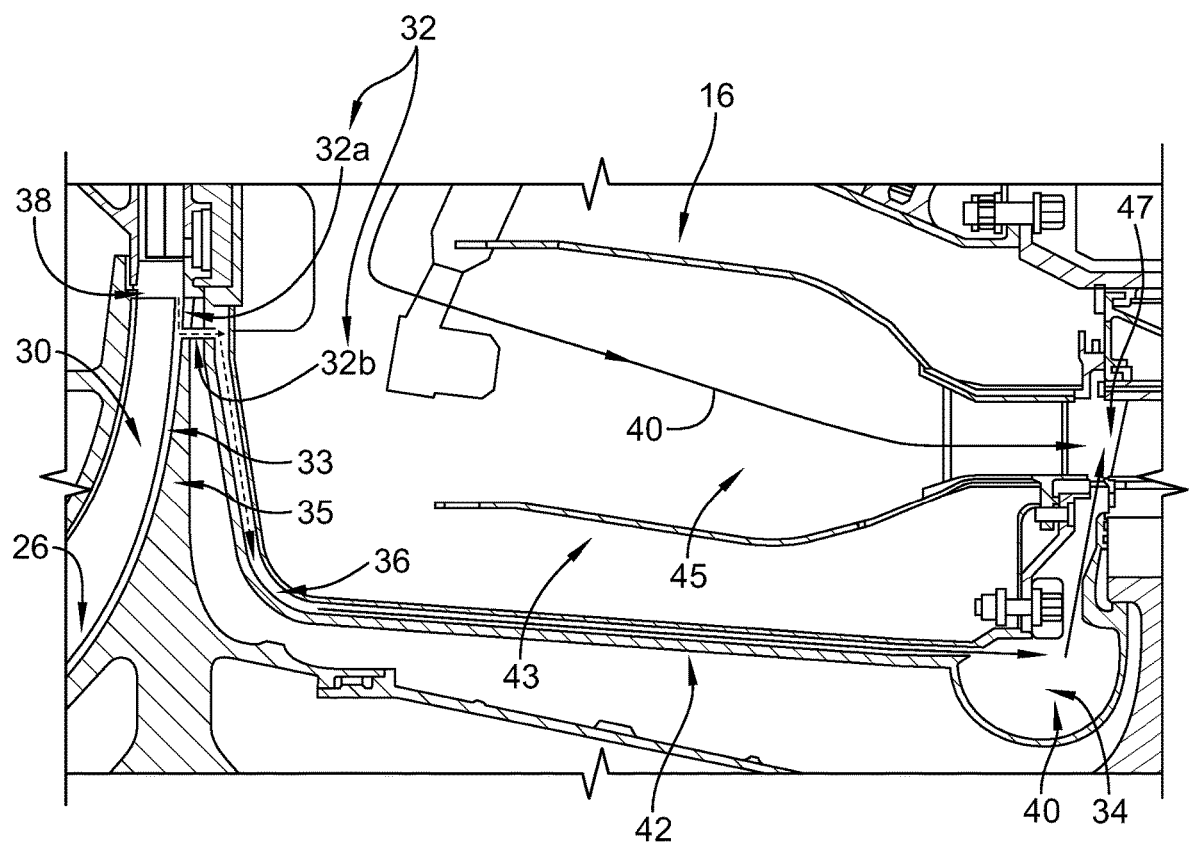
FIG. 3 is a closer view of portion of the cross-sectional view of FIG. 2 showing that the bleed inlet includes radial and axial sections for communicating the bleed air from the impeller, and showing that the radial section is formed within a clearance between the impeller and a wall of the compressor.

In the illustrative embodiment as shown in FIG. 3, the bleed inlet 32 is illustratively embodied to include a radial section 32a and an axial section 32b. The radial section 32a is illustratively formed within a clearance 33 defined between the impeller 26 and a stationary wall 35 that is positioned aft of the impeller 26 and forms a cavity of the compressor 14. The axial section 32b is illustratively embodied as a conduit that is fluidly connected between the clearance 33 and the transport section 36. Heat that would otherwise build up within the clearance 33 is thus removed through the bleed inlet 32, thus cooling the compressor 14. The bleed inlet 32 illustratively connects with the transport section 36 to pass the stream of bleed air onto the deposit junction.

Returning to FIG. 2, the transport section 36 illustratively connects with the bleed inlet 32 and extends along the inner combustor casing 42. The inner combustor casing 42 illustratively defines a portion of a combustion housing 43 that contains a combustion chamber 45 of the combustor 16. The transport section 36 illustratively connects with the deposit junction 34. The stream of bleed air is extracted (bled) out from the core flow path 40 through the bleed inlet 32, along the transport section 36, and into the deposit junction 34.

As shown in FIG. 2, the deposit junction 34 is illustratively embodied as a forward wheel cavity 44 of the turbine 18 which houses the turbine rotor 20. The stream of bleed air is illustratively expelled from the transport section 36 into the forward wheel cavity 44 and pressurizes the forward wheel cavity 44. In the illustrative embodiment, the stream of bleed air leaks from the pressurized forward wheel cavity 44 into the core flow path 40 at a location 47 between a first stage vane 46 and a first stage blade 48 of the turbine 18. Accordingly, the bleed air purges and cools the forward wheel cavity 44 before (re)introduction into the core flow path 40.

Figure 4:
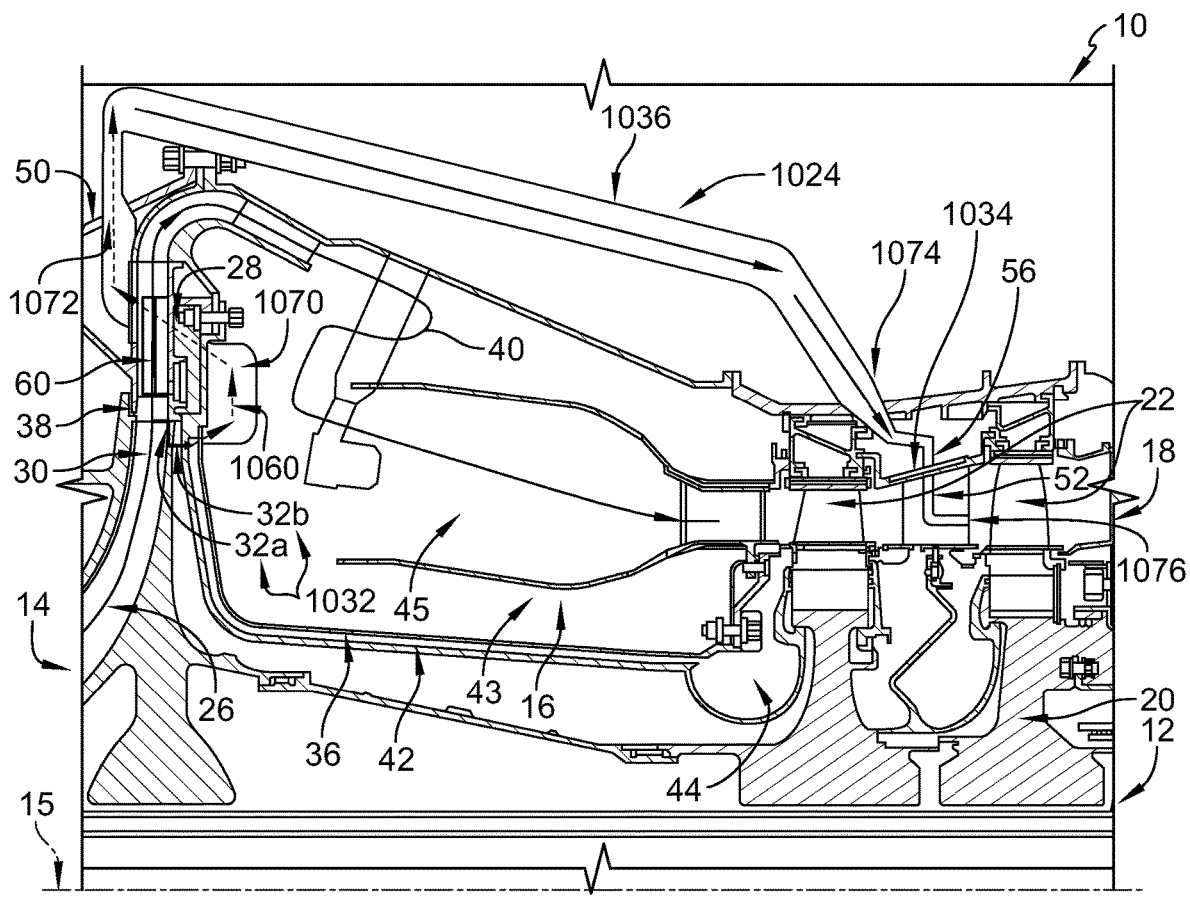
FIG. 4 is a cross-sectional view of the gas turbine engine of FIG. 1 taken along the window section 2-2 showing another illustrative embodiment of the bleed circuit in which bleed air is taken from the impeller and directed through a diffuser and out through an outer casing of the gas turbine engine along the outer casing and into a shroud of a second stage vane of the turbine.

In another illustrative embodiment as shown in FIG. 4, the gas turbine engine 10 includes a bleed circuit 1024 for communicating a bleed stream of air from the compressor 14 to the turbine 18 for cooling and/or purging. The bleed circuit 1024 is illustratively embodied as a flow passage distinct from the core flow path to provide bleed stream air to the turbine 18. The bleed circuit 1024 illustratively extends fluidly between the compressor 14 and the turbine 18.

As shown in FIG. 4, the bleed circuit 1024 illustratively includes a bleed inlet 1032 for bleeding a stream of air from the compressor 14, a deposit junction 1034 for expelling the stream into the turbine 18, and a transport section 1036 connected between each of the bleed inlet 1032 and the deposit junction 1034 to communicate bleed air therebetween. The bleed inlet 1032 is illustratively embodied as a bleed passage disposed near to the impeller tip 30, and particularly, near to the interface gap 38 between the impeller tip 30 and the diffuser 28. The bleed inlet 32 is configured to receive a stream of bleed air from the impeller tip 30 removed outside of the core flow path (as represented by arrows 40 in FIG. 4).

In the illustrative embodiment as shown in FIG. 4, like the bleed inlet 32, the bleed inlet 1032 illustratively includes the radial section 32a and axial section 32b to provide cooling to the impeller 26 as mentioned above in reference to FIG. 3. However, unlike the bleed circuit 24, the bleed inlet 1032 of the bleed circuit 1024 continues from the axial section 32b and forms an inlet passage 1070 that extends through the diffuser 28 as described in detail below. The inlet passage 1070 illustratively proceeds through the diffuser 28 and penetrates through an outer casing 50 of the gas turbine engine 10 at a location 1072 for connection with the transport section 1036.

In the illustrative embodiment, the outer casing 50 is embodied as an outer bypass duct of the gas turbine engine 10 which surrounds the engine core 12 and through which bypass air is directed distinct from the core flow path 40. The transport section 1036 illustratively extends along the axis 15 radially outside of the outer casing 50 towards the aft end 19 of the gas turbine engine 10 as shown in FIG. 4. The transport section 1036 illustratively penetrates through the outer casing 50 at a location 1074 near to the turbine 18 and connects with the deposit junction 1034.

In the illustrative embodiment as shown in FIG. 4, the deposit junction 1034 includes a vane cooling path 52 of a second stage vane 54 of the turbine 18. The transport section 1036 illustratively extends through a vane shroud 56 of the turbine 18 and connects with the vane cooling path 52 to expel the stream of bleed air into the vane 54 for cooling. The stream of bleed air illustratively passes through the vane cooling path 52 to cool the vane 54 (receive heat therefrom) and is discharged into the core flow path 40 at a location 1076. In some embodiments, the heated stream of bleed air may be routed to any of the bypass duct, into the exhaust stream, and/or any other suitable discharge location.

Figure 5:
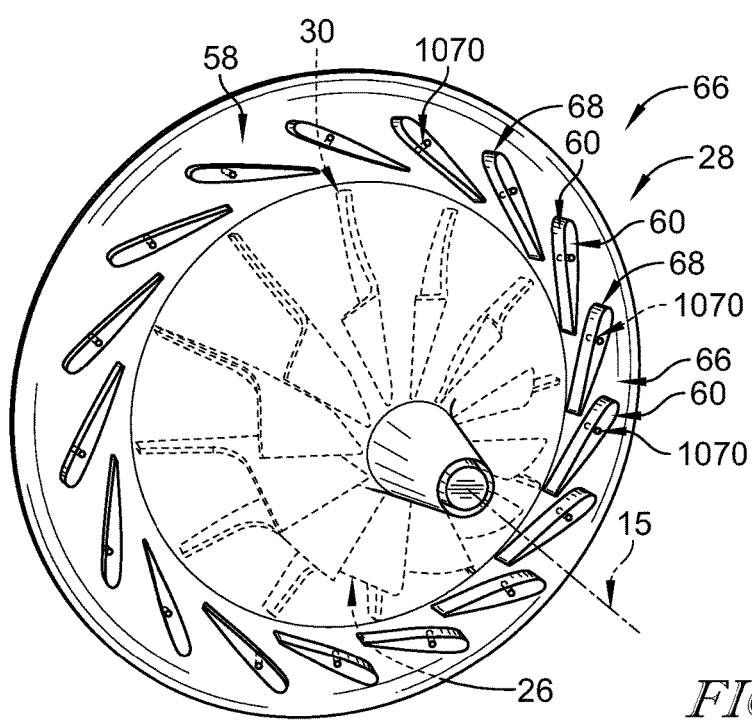
FIG. 5 is a front perspective view of the impeller of compressor of the gas turbine engine of FIG. 1 showing that the impeller includes a number of impeller vanes that each include inlet passages defined therethrough to communicate bleed air along the bleed circuit.

In the illustrative embodiment as shown in FIG. 5, the diffuser 28 illustratively includes a body 58 and number of diffuser vanes 60 extending from the body 58 along the axis 15 (axis 15 extending into the page). The diffuser 28 illustratively includes a forward side 66 and an aft side opposite to the forward side 66. The impeller 26 is illustratively shown in broken line relative to the impeller 26. The diffuser vanes 60 each illustratively connect to the body 58 on the forward side 66 and extend axially forward into the engine core flow path 40. The diffuser 28 illustratively includes passages 68 defined between the diffuser vanes 60 and extending radially to communicate the compressed air therethrough. The diffuser vanes 60 each illustratively include curvature configured to collect the compressed air from the impeller 26 within the passages 68 and to increase the pressure by reducing the velocity within the engine core flow path 40. In some embodiments, the diffuser 28 may be adapted to form a partially divergent area to increase pressure into the combustor 16.

As mentioned above, in the illustrative embodiment as shown in FIG. 5, the diffuser vanes 60 each include a portion of an inlet passage 1070 defined therein. Each inlet passage 1070 illustratively penetrates through its respective diffuser vane 60 along the axis 15 from the aft side to the forward side 66 of the diffuser 28. Each inlet passage 1070 illustratively connects with the bleed inlet 1032 as manifold to receive bleed air therefrom.

In the illustrative embodiment as shown in FIG. 5, each inlet passage 1070 is connected on the aft side of the diffuser 28 with the bleed inlet 1032 and with the transport section 1036 on the forward side 66 of the diffuser 28. The inlet passage 1070 receives the stream of bleed air from the bleed inlet 1032 on the aft side 68, passes the stream through the inlet passage 1070 from the aft side 68 to the forward side 66 of the diffuser 28 such that the stream flows in a direction towards the forward end 17 of the gas turbine engine 10. The inlet passage 1070 discharges the stream to the transport section 1036 on the forward side 66 of the diffuser 28. This arrangement provides the stream of bleed air to the turbine 18 by routing axially through the diffuser 28 and radially outside of the outer casing 50 to easily and efficiently transport the bleed air to the turbine vane 54. In some embodiments, the inlet passage 1070 may pass through fewer than all of the diffuser vanes 60.

In the illustrative embodiment as shown in FIG. 1, the gas turbine engine includes a pair of concentric drive shafts 70, 72 connecting portions of the turbine 18 to other engine components to provide rotational drive to those components. For example, the turbine 18 illustratively includes an HP rotor 74 and an LP rotor 76, the HP rotor 74 being connected to one end of an HP drive shaft 70 the other end of which is connected to a rotor 78 of the compressor 14 to transmit rotational force thereto. The LP rotor 76 is illustratively connected to one end of an LP drive shaft 72 the other end of which is connected to a fan rotor 80 having fan blades 82 for receiving rotational force from the LP rotor 76 to rotate the fan rotor 80 and blades 82 to draw air into the gas turbine engine 10.

As described herein regarding FIGS. 2 and 4, the bleed circuits 24, 1024 are illustratively presented in insolation from each other. In some embodiments, the bleed circuits 24, 1024 are incorporated in parallel with each other to provide a stream of bleed air to each of their respective deposit junctions 34, 1034. In some embodiments, flow control devices, for example but without limitation, valves and/or dampers, may be located within the bleed circuits 24, 1024 to apportion bleed flow according to operational conditions.

In the illustrative embodiment, the compressor 14 illustratively includes an axial section and a centrifugal section including a single centrifugal stage, but in some embodiments may have any number of centrifugal stages. In some embodiments, at least a portion of the bleed air removed from the impeller tip 30 may provide a portion of thrust force to balance the impeller 26 during rotation about the axis 15.

The present disclosure includes descriptions of gas turbine engines that use at least one centrifugal compressor. In such engines, it may become necessary to the compressor with cooling air. A problem is created to decide where to place that cooling air after its job of cooling the compressor has been performed. It can be advantageous to the engine fuel consumption and performance to put that cooling air to use somewhere else. The present disclosure finds a place to put the cooling air to increase the robustness of the cooling air circuit while minimizing the detrimental impact to engine performance. For example but without limitation, the cooling air can be used to cool a turbine vane and/or to pressurize the forward wheel cavity. In some embodiments, external routing of the cooling air between its source and sink provides simple and less-obstructed paths for communicating the cooling air.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
an engine core defining a rotating axis, the engine core includes a compressor having an impeller arranged to rotate about the axis to compress air with an impeller tip and a diffuser for collecting compressed air from the impeller tip, a combustor fluidly connected to receive compressed air from the diffuser for combustion, and a turbine fluidly connected to receive exhaust products from the combustor; the impeller, the diffuser, the combustor, and the turbine collectively defining a core flow path;
an outer shell disposed about the engine core to house the engine core therein; and
a bleed circuit fluidly connected between the compressor and the turbine for communicating a stream of impeller air from the impeller to the turbine, the bleed circuit including a bleed inlet and a transport section, the bleed inlet arranged at the impeller tip and configured to bleed the stream of impeller air out from the core flow path and to communicate the stream of impeller air to the transport section, and the transport section in fluid communication with a deposit junction of the turbine,
wherein the bleed inlet is formed to include a radial section extending radially inwardly at least partially within a clearance between the impeller and a stationary wall located aft of the impeller and configured to receive the stream of impeller air from the impeller tip and an axial section extending axially aft through the stationary wall for communication with a transport section, wherein each of the radial and axial sections are arranged near the impeller tip,
wherein the bleed circuit further includes an inlet passage that receives the stream of impeller air from the axial section, at least a portion of the inlet passage is located aft of the impeller, the inlet passage conducts the stream of impeller air axially forward and radially outward where the inlet passage penetrates the outer shell and connects with the transport section that extends axially relative to the axis outside of the outer shell to a location near the turbine.

2. The gas turbine engine of claim 1, wherein the deposit junction includes a vane cooling path of a second stage vane of the turbine and the stream of impeller air passes through the vane cooling path to cool the second stage vane.

3. The gas turbine engine of claim 1, wherein the section connects with a plenum of the second stage vane of the turbine.

4. The gas turbine engine of claim 3, wherein the at least a portion of the inlet passage is located in the combustor.

5. The gas turbine engine of claim 4, wherein the inlet passage penetrates the outer shell axially forward of diffuser vanes included in the diffuser.

6. The gas turbine engine of claim 1, wherein the inlet passage is defined through at least one blade of the diffuser and in communication with the bleed inlet.

7. A gas turbine engine comprising
an engine core defining a rotating axis, the engine core including a compressor configured to provide compressed air, a combustor fluidly connected to receive the compressed air from the compressor for combustion, and a turbine fluidly connected to receive exhaust products from the combustor; the compressor, the combustor, and the turbine collectively defining a core flow path, and the compressor including an impeller having an impeller tip and a diffuser for collecting the compressed air from the impeller tip of the impeller; and
a bleed circuit fluidly connected between the compressor and the turbine for communicating a stream of air from the impeller of the compressor,
wherein the combustor includes an inner combustor casing and a transport wall, the inner combustor casing defining a portion of a combustion housing, and the transport wall positioned radially outward of the inner combustor casing to locate the inner combustor casing between the transport wall and the impeller,
the bleed circuit including a bleed inlet, a transport section, and a deposit junction, the bleed inlet arranged at the impeller tip of the impeller upstream of the diffuser and configured to bleed the stream of air out from the core flow path and to communicate the stream of air to the deposit junction, the transport section connects with the bleed inlet and the deposit junction to communicate the stream of air between the inner combustor casing and the transport wall from the bleed inlet to the deposit junction so that the stream of air is conducted entirely radially outward of the inner combustor casing between the bleed inlet and the deposit junction, and the deposit junction communicates the stream of air back into the core flow path in the turbine,
wherein the transport wall includes a radially extending section near the bleed inlet and an axially extending section that extends aft from the radially extending section and forms a portion of the deposit junction.

8. The gas turbine engine of claim 7, wherein the deposit junction includes a forward wheel cavity of the turbine and the stream of air enters the forward wheel cavity for purging.

9. The gas turbine engine of claim 8, wherein the stream of air pressurizes the forward wheel cavity and leaks into the core flow path at a location between a first stage vane and a first stage blade of the turbine.

10. The gas turbine engine of claim 9, wherein the compressor includes the diffuser having a number of blades arranged to collect compressed air from the compressor and the bleed circuit comprises at least one inlet passage defined through at least one of the number of blades of the diffuser and in communication with the bleed inlet to receive the stream of air.

11. The gas turbine engine of claim 7, wherein the bleed circuit comprises at least one inlet passage defined through at least one blade of the diffuser and in communication with the bleed inlet to receive the stream of air.

12. A method of operating a gas turbine engine, the method comprising
flowing an engine core flow through each of a compressor, a combustor, and a turbine fluidly, the compressor including an impeller and a diffuser located directly downstream of the impeller,
bleeding a stream of air in a bleed circuit from a tip of the impeller of the compressor out from the core flow path between the tip of the impeller and the diffuser through a bleed inlet of the bleed circuit, the bleed inlet formed to include a radial section extending radially inward at least partially within a clearance between the impeller and a stationary wall and an axial section extending axially aft through the stationary wall for communication with a transport section, each of the radial and axial sections arranged near the tip of the impeller,
conducting the stream of air axially aft in the transport section such that the stream of air is located entirely radially outward of an inner combustor casing of the combustor while being conducted through the transport section, and
depositing the stream of air to a deposit junction of the turbine such that the stream of air in the deposit junction is located radially outside of the inner combustor casing.

13. The method of claim 12, wherein the deposit junction includes a vane cooling path of a second stage vane of the turbine and the stream of air passes through the vane cooling path to cool the second stage vane.

14. The gas turbine engine of claim 12, wherein bleeding includes flowing the stream of air through at least one inlet passage defined through at least one of a number of blades of the diffuser of the compressor.

15. The gas turbine engine of claim 14, wherein bleeding includes flowing the stream of air through at least one transport passage that extends along the engine outside of an outer shell to a location near the turbine and into a plenum of the second stage vane of the turbine.

16. The gas turbine engine of claim 12, wherein bleeding includes passing the stream of air through at least one inlet passage in a direction towards a forward end of the gas turbine engine.

17. The method of claim 12, wherein bleeding the stream of air includes bleeding the stream of air through at least one inlet passage of the bleed circuit defined through at least one blade of the diffuser.

* * * * *